United States Patent Office 2,777,843
Patented Jan. 15, 1957

2,777,843

PREPARATION OF 4-PREGNEN-17α-OL-3,20-DIONE

John M. Chemerda, Metuchen, Earl M. Chamberlin, Westfield, and Edward W. Tristram, Cranford, N. J., assignors to Merck & Co., Inc., Rahway, N. J., a corporation of New Jersey No Drawing. Application December 2, 1954,
Serial No. 472,756

5 Claims. (Cl. 260—239.55)

This invention relates to the preparation of 4-pregnen-17α-ol-3,20-dione and particularly to the preparation of 4-pregnen-17α-ol-3,20-dione from 5-halo-bisnorcholanal, and to intermediates thus obtained.

The discovery of the remarkable properties of cortisone and hydrocortisone and similar related compounds, has stimulated wide interest in finding simpler and more economical methods of preparing such compounds. One of the more recent methods which has been developed for preparing these valuable steroids is the introduction of oxygen groups by subjecting desoxy steroids to the action of microorganisms. This development has led to the increasing importance of desoxy steroids which possess all the necessary groups with the exception of oxygen groups which may be introduced by fermentation methods. One of the more valuable of these desoxy steroids is 4-pregnen-17α-ol-3,20-dione which only lacks the 11-keto and 21-hydroxy groups of cortisone, and the 11β and 21-hydroxy groups of hydrocortisone. These oxygen groups can be added by fermenting the steroid with various microorganisms, as for example, fermentation with various strains of Curvularia will introduce an 11β-hydroxy group, and fermentation with various strains of Sphaeroidaceae will introduce a 21-hydroxy group.

The preparation of 4-pregnen-17α-ol-3,20-dione has heretofore been carried out by a costly and complex process which involved the enolization of bisnorcholanal followed by ozonization of the resulting enol ester, reductive decomposition of the ozonide to the corresponding 21-keto-pregnane, enolization of this compound to form a Δ¹⁷,²⁰-20-acetoxy-pregnane, peracid oxidation of the 17,20 double bond to produce the 17,20 epoxide derivative of the unsaturated ester, and finally hydrolysis of this compound to produce 4-pregnen-17α-ol-3,20-dione.

It has been suggested to prepare 5α-halo-bisnorcholanic acids and aldehydes starting with stigmasterol. The halogen in the 5α-halo-bisnorcholanic aldehydes represents a potential double bond and yet is impervious to attack during the oxidation of the 3-hydroxyl group to the 3-keto group.

An object of the invention is to provide a simplified procedure for producing 4-pregnen-17α-ol-3,20-dione from readily available starting material. Another object of the invention is to provide a process for the degradation of the aldehyde group in 5α-halo-bisnorcholanaldehyde to the 17α-hydroxy-20-keto side-chain without removal of the 5α-halo group. A further object is to provide valuable intermediates useful in this process. Other objects and the advantages of the invention will appear hereinafter.

In accordance with the invention, 4-pregnen-17α-ol-3,20-dione (Compound VII) is prepared by the following series of reactions: brominating a 5-halo-bisnorcholanal compound (Compound I) to produce the corresponding 5-halo-20-bromo-bisnorcholanal compound (Compound II), dehydrobrominating to produce the corresponding 5-halo-17(20)-bisnorcholenal compound (Compound III), treating with peracid to produce the corresponding epoxy formate (Compound IV), hydrolyzing to yield 5-halo-pregnane-3,17α-diol-20-one (Compound V), oxidation of the 3-hydroxy group to form a keto group (Compound VI) and dehydrohalogenating to produce 4-pregnen-17α-ol-3,20-dione (Compound VII).

As alternate steps to this procedure, the 5-halo-bisnorcholanal compound (Compound I) is converted directly to the corresponding 5-halo-17-(20)-bisnorcholenal (Compound III) by reacting with bromine in the presence of a weak base and a catalyst. The epoxy formate (Compound IV) is converted to 5-pregnene-3,17α-diol-20-one by saponification.

These reactions may be chemically represented wherein R is a group convertible to a hydroxy group by hydrolysis and X is a halogen as follows:

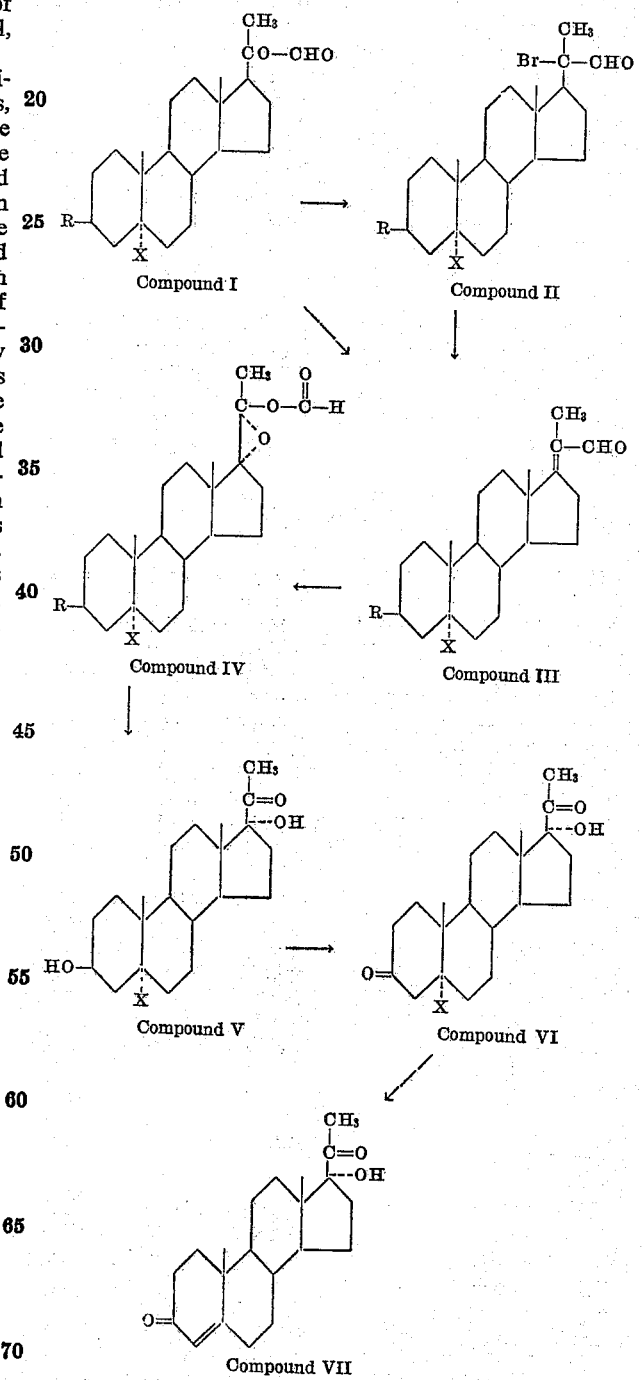

Compound VII

The 5-halo-bisnorcholanal compound is brominated to produce the corresponding 5-halo-20-bromo-bisnorcholanal. The 5-halo-bisnorcholanal compound has either a 5α-chloro or 5α-bromo group and a substituent at the 3-position which may be readily hydrolyzed to a hydroxy group, such as an ether group of the formula OR², wherein R² is a hydrocarbon group and especially a hydrocarbon radical containing up to and including eight carbon atoms, e. g. methyl, ethyl, propyl, isopropyl, butyl, hexyl, cyclohexyl, benzyl and the like, or an ester group of the formula OCOR³, wherein R³ is a hydrocarbon radical, especially hydrocarbon radicals containing up to and including seven carbon atoms, such as methyl, ethyl, propyl, isopropyl, butyl, hexyl, heptyl, phenyl, cyclohexyl, and the like.

The bromination may be conveniently carried out by dissolving or suspending the 5-halo-bisnorcholanal in an organic solvent and subjecting the solution or suspension to the action of approximately an equal molar amount of bromine. There is sufficient hydrogen bromide formed during the reaction to act as a catalyst. It is preferred to use chloroform as a solvent, although other solvents may be used, such as acetic acid, formamide and mixtures of solvents, such as acetic acid-pyridine and acetic acid-formamide. The reaction temperature governs the rate of bromination, thus the rate of bromination increases at elevated temperatures. It is ordinarily desired, for convenience, to effect the bromination at about 20 to 60° C. although temperatures as low as 0° C. can be used under normal atmospheric pressure. Within the preferred temperature range the reaction usually is complete in from one-half to six hours.

The 5-halo-20-bromo-bisnorcholanal compound is readily dehydrobrominated to produce the corresponding 5-halo-17(20)-bisnorcholenal. The dehydrobromination can be readily carried out by heating with metallic halides particularly with lithium chloride in an amide solvent, such as a N,N-dialkylacylamides having the formula

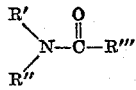

wherein R', R" and R''' are alkyl groups containing from one to six carbon atoms, as for example, N,N-dimethylformamide, N,N-dimethylacetamide, N,N-diethylformamide, N,N-diethylacetamide, N-methyl-N-ethylformamide, N,N-dimethylpropimamide and N-methyl-N-ethylacetamide. Other metallic halides which may be used are magnesium chloride, beryllium chloride, and aluminum chloride. Hydrogen bromide has also been found to be effective in place of the metallic halide. The dehydrobromination may also be carried out by the use of collidine, pyridine, lutidine, diethylaniline, or other organic bases which are refluxed with the bromo-steroid for a period of time of the order of 15 minutes. The product can be recovered by filtering, washing with water, and drying.

The 5-halo-bisnorcholanal compound is converted directly to the corresponding 5-halo-17(20)-bisnorcholenal compound. This may be readily carried out by reacting the bisnorcholanal with bromine in the presence of a weak base. The weak base is preferably a N,N-dialkylacylamide having the formula

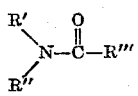

wherein R', R" and R''' are as defined above. Typical examples of such amides are: N,N-dimethylformamide, N,N-dimethylacetamide, N,N-dimethylpropamide, N,N-diethylformamide, N,N-diethylacetamide, N-methyl-N-ethylformamide, and N-methyl-N-ethylacetamide. The reaction time is reduced by the addition of any of the ordinarily use bromination catalysts such as hydrogen bromide, sulfuric acid or organic sulfonic acids as for example p-toluene sulfonic acid. The reaction is conveniently carried out at room temperature which requires from 12 to 28 hours for completion. The product can be recovered by diluting the reaction mixture with water, filtering, and then washing the product with water and drying.

The 5-halo-17(20)-bisnorcholenal compound is treated with an organic peracid to produce the corresponding epoxy formate (5α-halo-17,20-epoxy-pregnan-20-ol-3-R 20-formate). The organic peracid is preferably an aromatic percarboxylic acid, such as perbenzoic and perphthalic acids, and saturated aliphatic peracids, such as peracetic and persuccinic acids. This reaction results in nearly quantatitive yield of product. The reaction is preferably carried out in an organic solvent, such as benzene, chloroform, or ethyl acetate. The reaction is preferably carried at from minus 10° to 50° C., although the temperature may be varied within wide limits. At the preferred temperature range the reaction requires from 12 to 48 hours for completion. The rate of reaction will vary with the temperature. The product can be isolated from the reaction mixture by filtering to remove various insoluble byproducts and reactants, and then washing with water containing sodium carbonate. The organic layer is dried over sodium carbonate and evaporated to dryness under vacuum. The product can also be recovered by ether extraction followed by washing with dilute alkali and water, and evaporating to dryness.

The 5α-halo-17,20-epoxy-pregnan-20-ol-3-R 20 formate is hydrolyzed to yield 5-halo-pregnane-3,17α-diol-20-one. The hydrolysis is readily achieved by treating with an acid in a suitable solvent, such as methanol, ethanol, acetone, or tetrahydrofuran. Strong acid such as hydrochloric acid, sulfuric acid, perchloric acid, and para-toluene-sulfonic acid, used in dilute concentrations are preferred for effecting the hydrolysis. Temperatures ranging from about 0° to 80° C. are usually employed to accomplish the hydrolysis. At room temperature, several minutes to three hours are ordinarily adequate to complete the reaction. The heavy precipitate of product is filtered from the reaction mixture and washed with an organic solvent and dried under vacuum.

The epoxy formate is also converted to 5-pregnene-3,17α-diol-20-one by reacting with a basic substance. Water must be present unless reaction is run in alcohol. The reactants are preferably brought together in a solvent. Suitable solvents are methanol, ethanol, hexane, benzene, toluene, xylene, petroleum ether, ether, dioxane, tetrahydrofuran and the like. The basic substance may be any of the conventional bases, such as an alkali metal or alkali metal hydroxide, carbonates, bicarbonate or the like, but is it preferred to use an hydroxide as for example, sodium hydroxide, potassium methoxide, or potassium hydroxide. The reaction may be carried out at from 0° to 70° C. At room temperature the reaction requires from 30 to 120 minutes for completion. On completion of the reaction the reaction mixture is neutralized by addition of an acid as for example, glacial acetic acid, and then the solution is partially concentrated by evaporation under vacuum. The product is precipitated from the reaction mixture by addition of water and is then filtered and washed with water.

The 5-halo-pregnene-3,17α-diol-20-one is oxidized to produce 5-halo-pregnan-17α-ol-3,20-dione. The oxidation is preferably carried out with a chromic anhydride-pyridine complex, although other selective oxidizing agents may be used, such as chromic acid. The oxidation may be carried out at a wide range of temperatures, although preferably below 50° C. Within the preferred temperature range, with the preferred oxidation agent, the reaction requires from 6 to 24 hours. The product can be separated from the reaction mixture by conventional means.

The 5-chloro-pregnan-17α-ol-3,20-dione is treated with a basic substance to form 4-pregnan-17α-ol-3,20-dione.

This reaction is generally carried out under anhydrous conditions. The reactants are preferably brought together in a solvent. Suitable solvents are methanol, ethanol, hexane, benzene, toluene, xylene, petroleum ether, ether dioxane, tetrahydrofuran and the like. The basic substance may be any of the conventional bases, such as an alkali or alkaline earth metal hydroxide, carbonate, bicarbonate or the like but it is preferred to use a hydroxide as for example, sodium hydroxide or, potassium hydroxide. The reaction may be carried out at from 0° to 17° C. At room temperature the reaction requires from 30 to 120 minutes for completion. On completion of the reaction the reaction mixture is neutralized by addition of an acid as for example, glacial acetic acid, and then the solution is partially concentrated by evaporation under vacuum. The product is precipitated from the reaction mixture by addition of water and is then filtered and washed with water.

The following examples are given for purposes of illustration:

*Example 1*

3β-ACETOXY-5α-CHLORO-20-BROMO-BISNORCHOLANAL

A solution of 14.5 grams (0.0354 mole) of 3β-acetoxy-5α-chlorobisnorcholanal in 200 ml. of chloroform was treated with ten grams (0.1 mole) of anhydrous calcium carbonate and stirred at 28° C. To this slurry 46 milliliters of cholorform solution containing 5.5 grams (0.0344 mole) of bromine was added dropwise over a period of one-half hour and the reaction mixture stirred for two hours. After filtering to remove calcium carbonate the chloroform solution was washed with dilute sodium iodide, sodium thiosulfate solution and then with dilute sodium bicarbonate solution and finally dried over anhydrous sodium carbonate. The chloroform layer was then evaporated almost to dryness under vacuum and 100 milliliters of 95% ethanol was added. Upon further concentration the main portion of product precipitated. After standing overnight in the refrigerator the product, 3β-acetoxy-5α-chloro-20-bromobisnorcholanaldehyde, was filtered, washed with 50 milliliters of 95% ethanol and dried under vacuum; yield 10.6 grams, melting point 175°–179° C., $[\alpha]_D^{25°}$ +13.4 (chloroform). *Analysis.—*Calcd. for $C_{24}H_{36}O_3ClBr$: C, 59.07; H, 7.44. Found: C, 58.79; H, 7.43.

*Example 2*

3β-ACETOXY-5α-CHLORO-17(20)-BISNORCHOLENAL

Thirty-three grams (0.068 mole) of 3β-acetoxy-5α-chloro-20-bromobisnorcholanal in 1320 milliliters of dimethylformamide containing 5.5 grams (0.068 mole) of hydrogen bromide was allowed to stand at 28° C. for four days. The solution was then stirred and cooled in an ice bath while 600 milliliters of water was added. After stirring for three hours the product was filtered, washed with water and dried under vacuum to yield 26.8 grams of essentially pure 3β-acetoxy-5α-chloro-17(20)-bisnorcholenal, melting point 194°–195° C., λ maximum 2540, E percent 376. Recrystallization from methanol gave an analytical sample with the same ultraviolet absorption. *Analysis.—*Calcd. for $C_{24}H_{35}O_3Cl$: C, 70.82; H, 8.67; Cl, 8.71. Found: C, 70.51; H, 8.51; Cl, 8.58.

*Example 3*

3β-ACETOXY-5α-CHLORO-17(20)-BISNORCHOLENAL

Two grams (5 millimoles) of 3β-acetoxy-5α-chloro-bisnorcholanaldehyde and 0.04 gram of p-toluene sulfonic acid were dissolved in 80 milliliters of dimethylformamide and stirred at 28° C. while 0.8 gram (5 millimoles) of bromine in 7 milliliters of dimethylformamide was added dropwise over the course of three hours. After standing at normal room temperature for 24 hours the reaction mixture was cooled in an ice bath and diluted with 80 milliliters of water. The resulting slurry was stirred for an hour and then filtered. The product was washed well with water and dried under vacuum to yield 1.86 grams of impure 3β-acetoxy-5α-chloro-17(20)-bisnorcholenal, melting point 158°–163° C., λ maximum 2540 A., E percent 200. Several recrystallizations from ethanol gave product melting at 191°–193° C., λ maximum 2560 A., E percent 379. This product showed no depression in melting point when admixed with unsaturated aldehyde prepared from 3β-acetoxy-5α-chloro-20-bromo-bisnorcholanal.

*Example 4*

3β-ACETOXY-5α-CHLORO-17,20-EPOXYPREGNAN-20-OL FORMATE

A solution containing 15.7 grams (0.0386 mole) of 3β-acetoxy-5α-chloro-17(20)-bisnorcholenaldehyde in 150 milliliters of dry benzene at 10° C. was treated with 56 grams (0.309 mole) of perphthalic acid in 435 milliliters of ethyl acetate. The reaction mixture, after standing two days at normal room temperature, was filtered to remove insoluble phthalic acid and washed four times with 500 milliliters of 10% sodium carbonate solution. The organic layer was dried over sodium carbonate and evaporated to dryness under vacuum to yield 15.1 grams; melting point 139°–142° C.; $[\alpha]_D^{25°}$ −5.2° (chloroform). The infrared spectrum of the crude reaction product was compatible with the epoxy formate formulation and elemental analysis agreed with calculated values. *Analysis.—*Calcd. for $C_{24}H_{35}O_5Cl$: C, 65.66; H, 8.04; Cl, 8.08. Found: C, 65.64; H, 7.97; Cl, 8.12.

*Example 5*

5-PREGNENE-3β,17α-DIOL-20-ONE

One gram (2.4 millimoles) of 3β-acetoxy-5α-chloro-17,20-epoxypregnan-20-ol formate was dissolved in 150 milliliters of 95% ethanol at 30° C. and treated with 30 milliliters of 2.5 M sodium hydroxide solution. After standing for ninety minutes at normal room temperature 6 milliliters of glacial acetic acid was added and the solution was partially evaporated under vacuum. The product was precipitated by dilution with 75 milliliters of water and refrigerated overnight. The reaction mixture was filtered; the solid was washed with water and dried under vacuum to yield 0.55 gram of product, 5-pregnene-3β,17α-diol-20-one, melting at 200°–215° C. Recrystallization from ethanol gave product melting at 205°–210° C. which was not depressed upon mixture with authentic 5-pregene-3β,17α-diol-20-one. *Analysis.—*Calcd. for $C_{21}H_{32}O_3$. C, 75.85; H, 9.70. Found: C, 75.41; H, 9.66.

*Example 6*

5α-CHLORO-PREGNANE-3β,17α-DIOL-20-ONE

A slurry of 2.5 grams (5.7 millimoles) of 3β-acetoxy-5α-chloro-17,20-epoxypregnan-20-ol formate in 125 ml. of methanol was treated at normal room temperature with 12.5 milliliters of concentrated hydrochloric acid. A greenish-blue color developed and within an hour solution was practically complete. The reaction mixture was allowed to stand overnight and then was cooled for one hour in the refrigerator. The heavy precipitate of product, 5α-chloropregnane-3β,17α-diol-20-one, was filtered, washed with methanol and dried under vacuum; weight 1.0 gram, melting point 200°–205° C. Boiling with ethyl acetate dissolved little of the product but raised the melting point to 205°–210° C. The infrared sprectrum showed hydroxyl at 2.82 μ and 2.98 μ, carbonyl at 5.90 μ and no acetate grouping. Rotation in pyridine solution $[\alpha]_D 25°$ +1° C. *Analysis.—*Calcd. for $C_{21}H_{33}O_3Cl$: C, 68.36; H, 9.02; Cl, 9.61. Found: C, 68.33; H, 9.03; Cl, 9.51.

*Example 7*

4-PREGNEN-17α-OL-3,20-DIONE

A chromic anhydride-pyridine complex was formed by adding 1.3 grams (13 millimoles) of chromic anhydride in small portions with stirring to 13 milliliters of pyridine while keeping the temperature below 25° C. To this stirred slurry was added 1.3 grams (3.5 millimoles) of 5α-chloro-pregnane - 3β - 17α - diol - 20 - one in 26 milliliters of pyridine. No heat of reaction was observed but within one-half hour the mixture had become dark brown. After stirring overnight the reaction was poured into 500 milliliters of dilute sodium hydroxide solution. The precipitated product, 5α-chloro-pregnan - 17α - ol- 3,20-dione was stirred for one hour, filtered and washed with water.

The product was dissolved in 25 milliliters of pyridine and 50 milliliters of methanol, filtered to remove insoluble inorganic material and treated with 10 milliliters of 2.5 molar sodium hydroxide solution at room temperature for one hour. The reaction mixture was then diluted with 100 milliliters of water and refrigerated for one hour. Filtration of the solid precipitate, followed by washing with water and drying under vacuum yielded 0.6 gram of 17α-hydroxyprogesterone, melting point 200°–212° C., λ maximum 2420 A., E percent 488. A sample for analysis was recrystallized from ethanol, melting point 213°–218° C. Identity of the sample with authentic material was established by infrared analysis and mixed melting point. *Analysis.*—Calcd. for $C_{21}H_{30}O_3$: C, 76.32; H, 9.15. Found: C, 76.77; H, 9.58.

Any departure from the above description which conforms to the present invention is intended to be included in the scope of the claims.

What is claimed is:

1. Compounds having the structural formula:

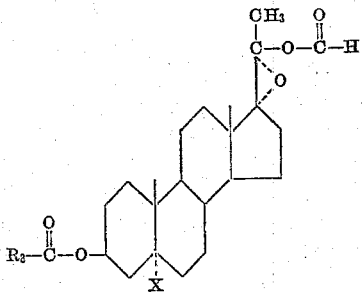

wherein $R^3$ is a hydrocarbon radical containing less than 9 carbon atoms and X is a halogen.

2. A process which comprises reacting

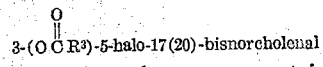

wherein $R^3$ is a hydrocarbon group containing less than 9 carbon atoms, with an organic peracid to form the corresponding

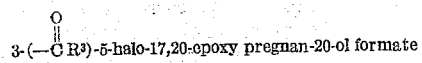

3. The process of claim 2 wherein the organic peracid is perphthalic acid.

4. 3β-acetoxy - 5α - chloro - 17,20 - epoxypregnan-20-ol formate.

5. A process which comprises reacting 3β-acetoxy-5α-chloro-17(20)-bisnorcholenal with perphthalic acid to produce 3β - acetoxy - 5α - chloro - 17,20-epoxypregnan-20-ol formate.

References Cited in the file of this patent

UNITED STATES PATENTS

| | | |
|---|---|---|
| 2,573,417 | Ehrenstein | Oct. 30, 1951 |
| 2,656,349 | Ruzicka | Oct. 20, 1953 |
| 2,671,084 | Lincoln | Mar. 2, 1954 |
| 2,704,768 | Colton | Mar. 22, 1955 |